United States Patent
Cameron et al.

(10) Patent No.: US 10,932,120 B2
(45) Date of Patent: Feb. 23, 2021

(54) DETERMINING MOBILE NETWORK CLASS OF SERVICE

(71) Applicant: Hewlett Packard Enterprise Development LP, Houston, TX (US)

(72) Inventors: Jeffrey M. Cameron, Omaha, NE (US); Anders H. Askerup, Omaha, NE (US); John I. Ayers, Omaha, NE (US)

(73) Assignee: Hewlett Packard Enterprise Development LP, Houston, TX (US)

(*) Notice: Subject to any disclaimer, the term of this patent is extended or adjusted under 35 U.S.C. 154(b) by 138 days.

(21) Appl. No.: 15/477,560

(22) Filed: Apr. 3, 2017

(65) Prior Publication Data
US 2018/0288603 A1    Oct. 4, 2018

(51) Int. Cl.
| | |
|---|---|
| H04W 8/08 | (2009.01) |
| H04W 8/04 | (2009.01) |
| H04W 8/06 | (2009.01) |
| H04W 36/00 | (2009.01) |
| H04W 76/16 | (2018.01) |
| H04W 8/12 | (2009.01) |
| H04W 8/18 | (2009.01) |
| H04W 60/04 | (2009.01) |

(52) U.S. Cl.
CPC ........... *H04W 8/08* (2013.01); *H04W 8/04* (2013.01); *H04W 8/06* (2013.01); *H04W 8/12* (2013.01); *H04W 8/18* (2013.01); *H04W 36/0022* (2013.01); *H04W 36/0083* (2013.01); *H04W 76/16* (2018.02); *H04W 60/04* (2013.01)

(58) Field of Classification Search
CPC combination set(s) only.
See application file for complete search history.

(56) References Cited

U.S. PATENT DOCUMENTS

| | | | |
|---|---|---|---|
| 6,148,197 A * | 11/2000 | Bridges | H04W 4/24 455/419 |
| 9,154,975 B2 | 10/2015 | Karaoguz et al. | |
| 9,198,022 B1 * | 11/2015 | Draznin | H04L 61/1588 |
| 9,357,372 B1 | 5/2016 | Leonid et al. | |

(Continued)

FOREIGN PATENT DOCUMENTS

| | | |
|---|---|---|
| EP | 1725065 A1 | 11/2006 |
| WO | WO-2017184103 A1 | 10/2017 |

OTHER PUBLICATIONS

Extended European Search Report, EP Application No. 18164723.1, dated Jun. 20, 2018, pp. 1-11, EPO.

(Continued)

*Primary Examiner* — Huy D Vu
*Assistant Examiner* — Bao G Nguyen
(74) *Attorney, Agent, or Firm* — Hewlett Packard Enterprise Patent Department

(57) ABSTRACT

Examples relate to determining mobile network class of service. In one example, a computing device may receive, from a mobility management entity (MME), a request from a device that requested access to a network operated by the MME, the request specifying an account identifier and location data that corresponds to the device; based on the location data, determine that the device is roaming; based on the account identifier and in response to the determination that the device is roaming, identify a class of service (CoS) for the device; and provide the MME with response data including the identified CoS.

20 Claims, 4 Drawing Sheets

(56) References Cited

U.S. PATENT DOCUMENTS

| | | | |
|---|---|---|---|
| 9,414,265 B2 | 8/2016 | Miller et al. | |
| 2006/0262752 A1* | 11/2006 | Moore | H04L 63/102 |
| | | | 370/331 |
| 2007/0002868 A1 | 1/2007 | Qian et al. | |
| 2008/0129588 A1* | 6/2008 | Lundgren | G01S 19/05 |
| | | | 342/357.43 |
| 2010/0330957 A1 | 12/2010 | Harada et al. | |
| 2011/0161504 A1* | 6/2011 | Zhou | H04W 76/10 |
| | | | 709/227 |
| 2014/0099945 A1* | 4/2014 | Singh | H04W 48/18 |
| | | | 455/432.1 |
| 2016/0021539 A1 | 1/2016 | Piscopo, Jr. et al. | |
| 2016/0142855 A1* | 5/2016 | Yu | H04W 4/70 |
| | | | 455/419 |
| 2017/0180976 A1* | 6/2017 | Shu | H04W 8/02 |
| 2017/0188223 A1* | 6/2017 | Gundavelli, Sr. | H04W 8/18 |

OTHER PUBLICATIONS

Cisco, "Release Change Reference, StarOS Release 20", Cisco Systems, Inc., Aug. 18, 2016, 618 pages.
Dornal, S., LTE: QoS (Part 2), Wired N Wireless Communicate . . . Discuss and Grow, (Research Paper), Jun. 3, 2009, 7 pages.
GSM Association, "GPRS Roaming Guidelines Version 8.0", Official Document IR.33, (Research Paper), May 20, 2015, 32 pages.
Hewlett Packard Corporation, "HSS LTE Roaming Controls Feature Requirements Specification", Version 3.1, Jan. 3, 2011, 33 pages.

* cited by examiner

DETERMINING MOBILE NETWORK CLASS OF SERVICE

BACKGROUND

Mobile networks allow a variety of devices to communicate in many different locations, e.g., using cellular networks that are operated by a variety of network operators, or carriers. Users subscribe to one or more network operators to make use of the network provided by those network operators. Mobile virtual network operators (MVNOs) are a network operators that do not own at least a portion of the network equipment used to provide network communications services to user equipment. Network operators often make use of classes of service as a means for prioritizing network traffic by providing different types of traffic with a different priority. For example, voice traffic may be given a higher priority than web browsing traffic; in addition, a network operator may treat MVNO subscriber traffic with a different priority than network traffic of their own subscribers.

BRIEF DESCRIPTION OF THE DRAWINGS

The following detailed description references the drawings, wherein.

DETAILED DESCRIPTION

Figure 1:
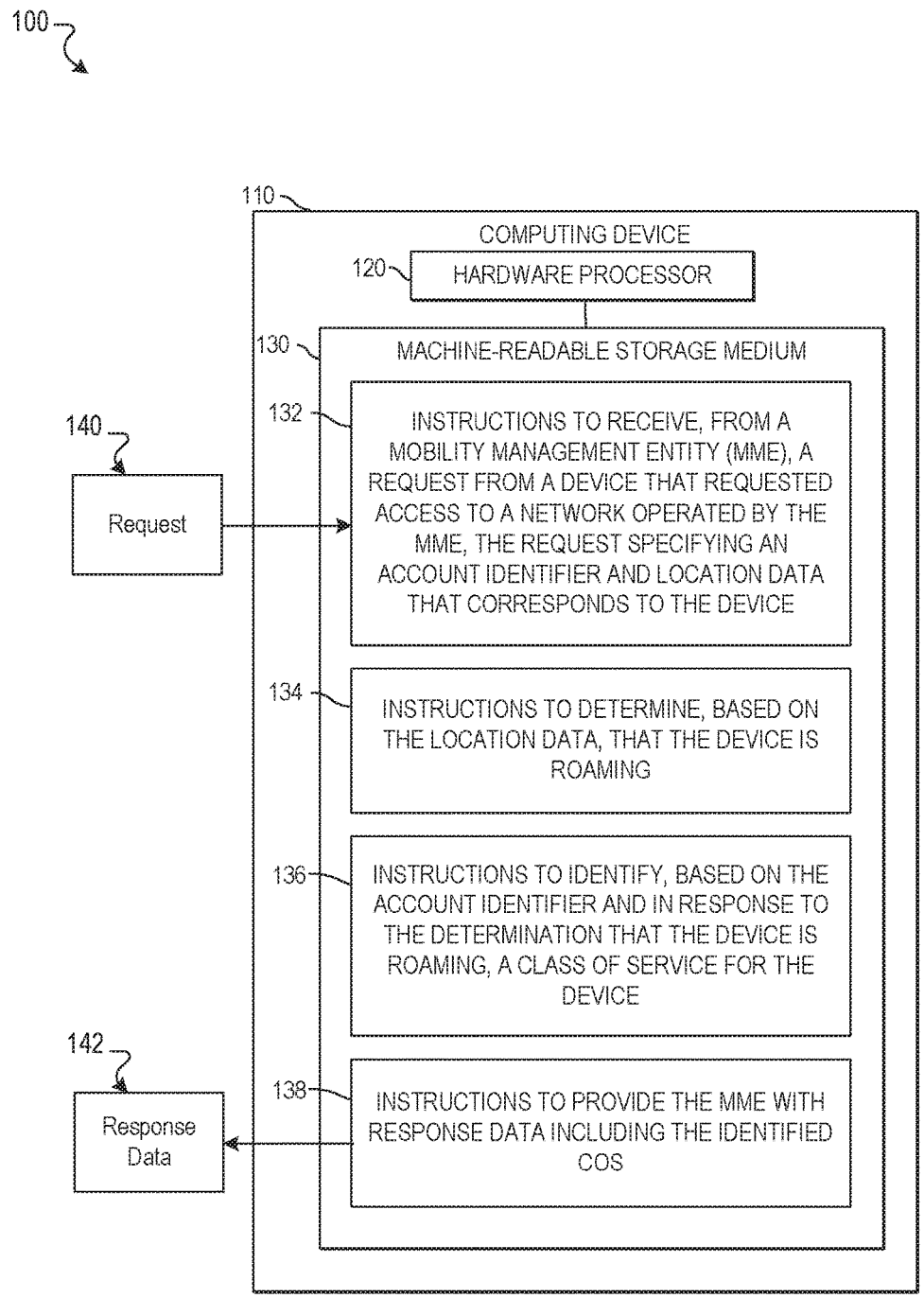
FIG. 1 is a block diagram of an example computing device for determining mobile network class of service.

In situations where network operators offer different classes of service for different types of network traffic, some network operators, including MVNOs, may use location information to determine which class of service to use for a given subscriber. For example, in situations where a network operator provides hardware and communications services in a variety of locations and for a variety of MVNOs, the network operator may forward authentication requests—received from user equipment—to a home subscriber server (HSS) of an MVNO, which may authenticate the user equipment while also providing the network operator with a class of service (CoS) to be used for communications associated with the requesting user equipment. The provided CoS may override any default CoS that would otherwise be used by the network operator, facilitating strategic use of the network operator's bandwidth while meeting MVNO and subscriber expectations regarding quality of service (QoS).

By way of example, an MVNO may have agreements with multiple carriers in multiple geographic locations, allowing the MVNO's subscribers to make use of network equipment operated by each of those carriers. For each subscriber, the MVNO may store account data, e.g., in a home subscriber server (HSS), which may specify a variety of information for the subscriber. Example account data for a subscriber may include authorized geographic locations, authorized local carriers, and data specifying a classes of service for the various geographic locations and/or carriers.

An MVNO subscriber may use a cellular phone to communicate with a particular network operator while roaming in a particular country. The network operator may include a mobility management entity (MME) responsible for handling communications for the network operator. The phone may send, to the MME, a request to access the network. The MME may route that request to MVNO equipment, e.g., using MVNO identifying data included in the request. The MVNO may determine that the subscriber is roaming based on location data included in the request, such as a mobile country code (MCC) and/or mobile network code (MNC). Account identifying information included in the request may be used to locate account data for the subscriber, and the location data may be used to identify—in the account data—a CoS associated with the particular country. The MVNO may then send a response to the MME, the response including, for example, authorization data indicating that the cellular phone is associated with an authorized MVNO subscriber and the CoS to be used by the network operator for the MVNO subscriber's communications. The provided CoS may override a default CoS, allowing MVNOs and local carriers to use different classes of service, e.g., based on agreements between the MVNOs and local carriers. As used herein, actions performed by an MME may refer to the actions of one or more network elements operating in the MME network, such as a serving gateway or PDN gateway, virtual or otherwise. Further details regarding the determination of mobile network class of service are described in the paragraphs that follow.

Referring now to the drawings, FIG. 1 is a block diagram 100 of an example computing device 110 for determining mobile network class of service. Computing device 110 may be, for example, a personal computer, a server computer, cluster of computers, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium 130. Hardware processor 120 may fetch, decode, and execute instructions, such as 132-138, to control processes for determining mobile network class of service. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions 132-138, for determining mobile network class of service.

As shown in FIG. 1, the hardware processor 120 executes instructions 132 to receive, from a mobility management entity (MME), a request 140 from a device that requested access to a network operated by the MME, the request specifying an account identifier and location data that corresponds to the device. For example, a home subscriber server (HSS) may receive the request 140 from MME cellular network equipment, which may have received an initial request from a mobile device, such as a cell phone. The account identifier may be a cell phone number or other account identifier, and the location data may be a MCC, MNC, and/or GPS data.

The hardware processor 120 executes instructions 134 to determine, based on the location data, that the device is roaming. For example, the hardware processor 120 may determine that a cell phone is roaming based on an MCC, MNC, and/or GPS data included in a request. In some implementations, the determination that the device is roaming may also be made based on account data for the device. For example, a cell phone number included in the request 140 may be used to identify a user account and account data associated with the requesting cell phone, and the account data may specify a home location and/or locations in which the cell phone is to be considered roaming.

The hardware processor 120 executes instructions 136 to identify, based on the account identifier and in response to the determination that the device is roaming, a class of service (CoS) for the device. For example, the computing device 110 may include or be in communication with a database that includes account data for the requesting device. The account data may be identified using the account identifier, and the account data may specify a CoS for each of multiple geographic locations. The identified CoS may be selected based on the geographic location specified by the location data. By way of example, an HSS may identify account data using a cell phone number included in a request provided by the cell phone. The account data may specify a CoS for each of multiple countries in which the cell phone may roam. Using the location data, such as an MMC included in the request, the HSS may identify and select the CoS associated with the location in which the cell phone is roaming.

Various methods and/or models may be used for handling different classes of service for communications associated with a device. For example, one classification model may specify a separate class of service, in descending order of priority, for voice traffic, video traffic, call signaling, network control traffic, critical data traffic, bulk data traffic, best effort traffic, and scavenger traffic. Other classification models may include additional classes of service or fewer classes of service. Classes of service serve as a means for a service provider, such as the MME, to determine the priority to be given to network traffic that is assigned a particular CoS.

The hardware processor 120 executes instructions 138 to provide the MME with response data 142 including the identified CoS. Providing the CoS in the response data 142 is designed to indicate to the MME which CoS, or priority, should be applied to traffic associated with the requesting device. In some implementations, the request includes an authentication request for the requesting device, and the hardware processor 120 authenticates the device using the account identifier included in the request. The authentication may also be provided in the response data 142. In this situation, the response data 142 provide the MME with both an indication that the requesting device is authorized to use the MME network equipment for network communications as well as a CoS to be used for those communications.

In some implementations, the MME has a default CoS, the identified CoS is different from the default, and the response data 142 includes an override that indicates the identified CoS should override the default CoS. For example, an MME may, by default, provide a video priority for network communications received from roaming devices that use an MVNO. In situations where the MVNO has negotiated a different CoS for a particular subscriber or for all of its subscribers, an override included in the response data 142 may cause the MME to override its default video priority, e.g., with a voice priority CoS.

In some implementations, the CoS identified for a device may depend on the service provider, e.g., instead of or in addition to location-based CoS. For example, an HSS may use an MME identifier included in the request it receives from the MME to determine which MME the requesting device is in communication with. The account data associated with the requesting device may have a CoS associated with that particular MME in that given location. In this situation, the HSS may then select that CoS to be provided to the MME in the response data.

In some implementations, additional requests from the same device may be treated differently, e.g., based on a different location and/or a different MME. For example, the HSS may receive, from a second MME, a second request that was provided by the same device, the second request including the same account identifier and second location data that correspond to the device. Based on the second location data, which may be the same as or different from the original location data, the hardware processor 120 may determine that the device is roaming and use the account identifier and second location data to identify a second CoS for the device that is different from the original CoS. This second CoS may differ, for example, based on the device using the second MME and/or based on the second location being different from the original. As before, second response data, which includes the second CoS, is provided to the second MME. Additional examples regarding the determination of mobile network class of service are provided with respect to FIGS. 2-4.

Figure 2:
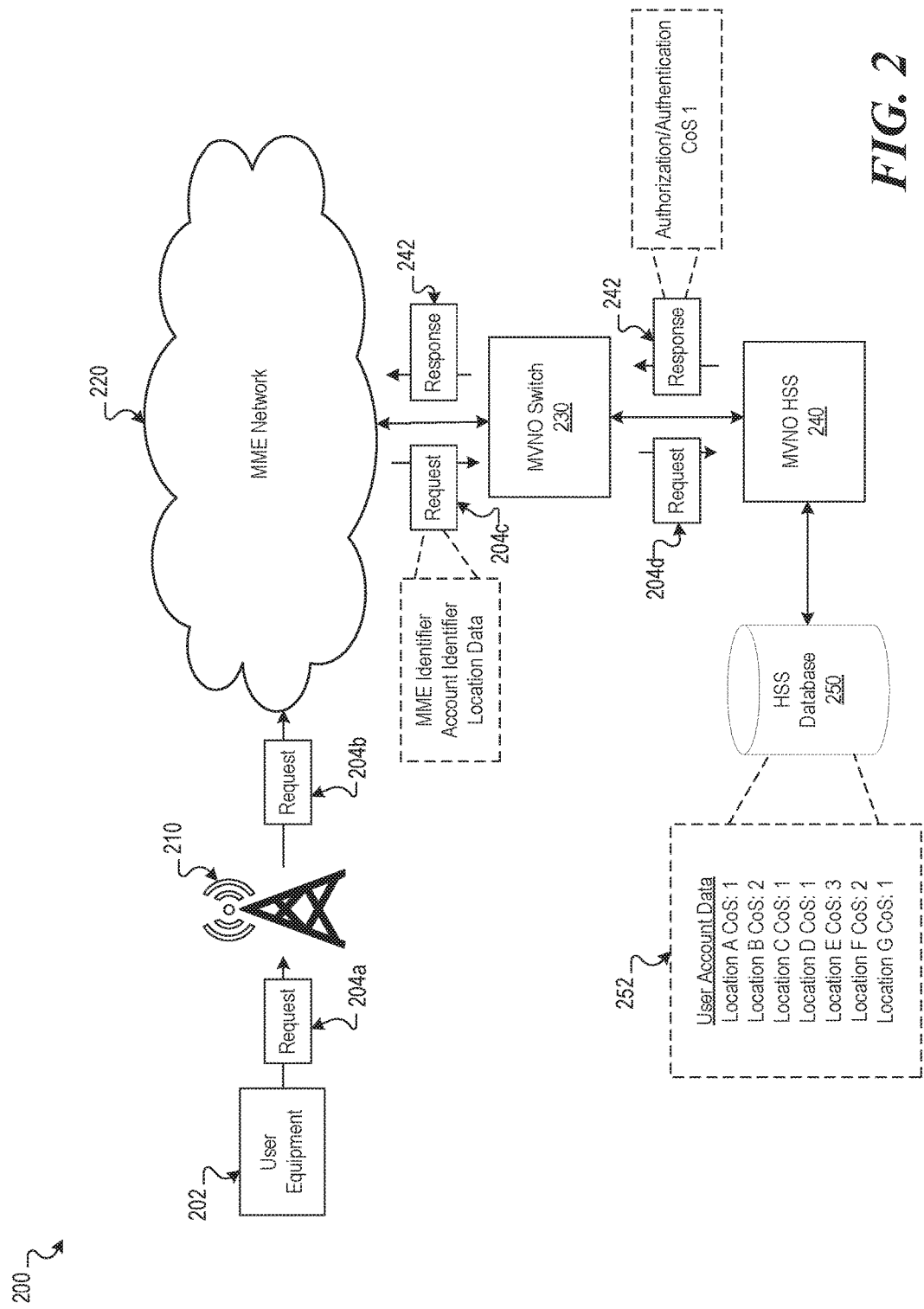
FIG. 2 is an example data flow depicting the determination of mobile network class of service.

FIG. 2 is an example data flow 200 depicting the determination of mobile network class of service. The example data flow 200 includes the following: user equipment 202, such as a cellular phone, tablet computer, laptop computer, or other electronic device capable of network communications; a base station 210, such as a cellular or Wi-Fi tower; an MME network 220, which may include a variety of equipment, including network switches and routers, server computers, and other devices owned and operated by the MME providing network service through the base station 210; an MVNO switch 230, which is a networking device that facilitates the routing of data between the MME network and the HSS 240 of the MVNO; the MVNO HSS 240 is a home subscriber server of the mobile virtual network operator, which may include a server computer that handles subscriber data for its subscribers, including the handling of requests for access to MME networks while those subscribers and their devices are roaming; an HSS Database 250 is a storage device that stores data that facilitates the HSS in making determinations regarding authorization of subscriber equipment and classes of service to be used for communications of the subscriber equipment.

During operation, the user equipment 202 sends a request 204a to the base station 210. For example, a cellular phone may attempt to access a cellular network by communicating with nearby base stations and sending one or more requests to those base stations. The request 204a may include a variety of data regarding the user equipment 202, including an account identifier for the user/subscriber, such as a user identifier, SIM card identifier, or telephone number.

The base station 210 forwards the request 204b to its corresponding MME network 220 equipment. The base station 210 may be owned and/or operated by a particular MME, and the request 204*b* provided to the MME network 220 may differ from that provided by the user equipment 202. For example, the request 204*a* provided by the user equipment 202 may use one of a variety of technological interfaces, such as CDMA, HSPA, LTE, EV-DO, and/or others. The request 204*b* provided by the base station 210 may use a different interface, and may include different information than the information included in the request 204*a* provided by the user equipment 202. For example, the request 204*b* provided by the base station 210 may include an identifier for the base station 210.

In the example data flow 200, the request 204*b* is forwarded to the MME network 200, e.g., through a network switch in communication with the base station 210. As noted above, the MME network 220 may include a variety of devices used to handle network communications, including switches, routers, and server devices, some of which facilitate the authentication of user equipment and communications between the user equipment and other entities. In the example data flow 200, the request 204*c* is provided to an MVNO switch 230 by the MME network 220. The request 204*c* may, in some implementations, be modified again during transit through the MME network 220. For example, MME network 220 equipment may determine, based on an account identifier included in the request 204*b*, that the request 204*b* should be routed to a particular MVNO for authentication. In this situation, the MME network 220 equipment may add data to the request 204*c* that identifies the MME. The example request 204*c* includes an MME identifier, an account identifier, and location data. As noted above, the location data may take a variety of forms, such as a mobile country code (MCC), a mobile network code (MNC), base station location data, and/or user equipment GPS data. In some implementations, location data may be included in other information, such as the MME identifier or account identifier.

The MVNO switch 230 routes the request 204*d* to the MVNO HSS 240. As noted above, the HSS 240 may be a server computer that may handle authentication requests and MVNO subscriber communications and may also provide CoS data for a serving network to provide network services to MVNO subscribers. In the example data flow 200, the MVNO HSS is in communication with an HSS database 250, which stores user account data 252 for MVNO subscribers. The HSS 240 uses the account identifier included in the request 204*d* to identify user account data 252 in the HSS database 250. The example user account data 250 includes a variety of locations in which the user equipment 202 associated with the user account is authorized to roam, and classes of service for the locations. Using the location data included in the request 204*d*, the HSS 240 selects a CoS. For example, in location A the HSS 240 would select CoS 1; in location B the HSS 240 would select CoS 2; in location C the HSS 240 would select CoS 1; in location D the HSS 240 would select CoS 1; in location E the HSS 240 would select CoS 3; in location F the HSS 240 would select CoS 2; and in location G the HSS 240 would select CoS 1. In some implementations, other information, such as an MME identifier, may also be used to select a CoS. In the example user account data 252, each CoS number indicates a separate class of service, e.g., 1 may be a highest priority, such as a voice traffic priority, 2 may be a second highest priority, such as a video traffic priority, and 3 may be a third highest priority, such as a best effort priority. As noted above, a variety of different CoS priority methods may be used to define different classes of service.

After identifying a CoS using the account identifier and location data, the HSS 240 provides the MME network 220 with a response 242 that includes an identified class of service—CoS 1—and, in this example, authorization/authentication data. The authorization/authentication data is an indication to the MME that the requesting user equipment 202 is authentic and is an MVNO subscriber authorized to use the MME network for network communications. The CoS included in the response is the CoS that the MME network 220 is to use in handling network communications to/from the user equipment 202. The classes of service used for different user equipment, different MMEs, and different MVNO subscribers may vary, e.g., allowing subscribers, MVNOs, and MMEs to expect and provide a CoS consistent with expectations, which may vary depending on the subscriber, the MVNO, and the MME, e.g., through agreements between the aforementioned entities.

The aforementioned devices are depicted in the example data flow 200 as one potential implementation, and a variety of other configurations—including additional devices or fewer devices—may be used in various implementations of a system for determining mobile network class of service. For example, in some implementations the HSS database 250 may be included in the MVNO HSS 240, and more than one database 250 and/or HSS 240 may be used. As another example, some implementations may not include an MVNO switch 230 and rely on other network devices, such as those included in the MME network 220, for routing data to the HSS 240.

Figure 3:
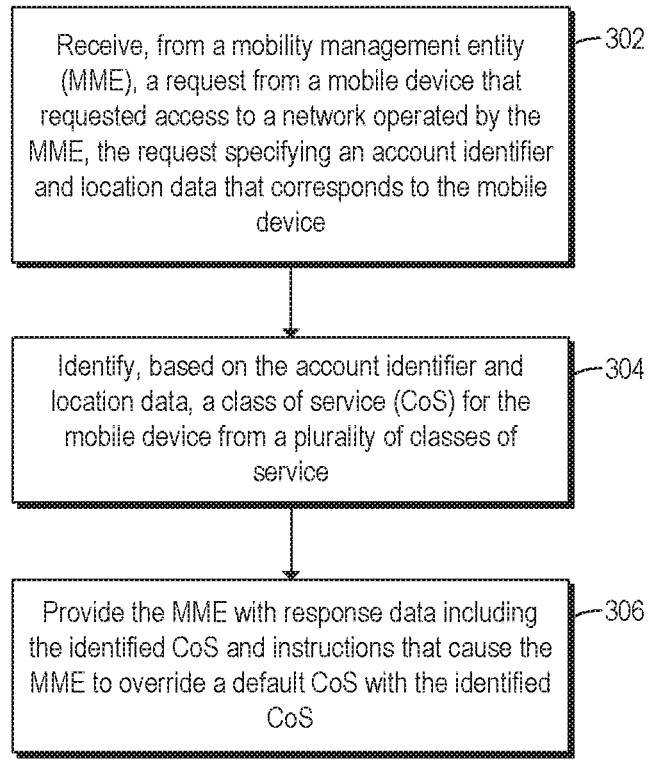
FIG. 3 is a flowchart of an example method for determining mobile network class of service.

FIG. 3 is a flowchart of an example method 300 for determining mobile network class of service. The method 300 may be performed by a computing device, such as the computing device described in FIG. 1 or the HSS described with respect to FIG. 2. Other computing devices may also be used to execute method 300. Method 300 may be implemented in the form of executable instructions stored on a machine-readable storage medium, such as the storage medium 130, and/or in the form of electronic circuitry, such as an FPGA or ASIC.

From a mobility management entity (MME), a request is received that is from a mobile device that requested access to a network operated by the MME, the request specifying an account identifier and location data that corresponds to the mobile device (302). For example, the request may originate from a cell phone requesting access to the MME's network, the account identifier may include a SIM card identifier, and the location data may include the MCC of the country in which the MME operates. In some implementations, other types of location data may be provided with the request, such as an MNC or GPS data.

Based on the account identifier and location data, a class of service (CoS) is identified for the mobile device from a plurality of classes of service (304). In some implementations, account data associated with the account identifier may be identified in a database, and the account data may specify a CoS for each of multiple geographic locations. For example, the SIM card identifier may be used to identify a user account in a subscriber database, and the user account data may specify that, for the country indicated by the MCC, a particular CoS should be used, such as CoS 2.

In some implementations, the request includes a request for authentication of the device. In this situation, the method 300 may include authenticating the device using the account identifier specified by the request. For example, the user account data identified using the SIM card identifier may indicate that the device requesting access to the MME network is authentic.

The MME is provided with response data including the identified CoS and instructions that cause the MME to override a default CoS with the identified CoS (306). By way of example, the MME may have a default CoS of 1 for voice traffic, but the MVNO HSS may instruct the MME to use a CoS of 2 for voice traffic associated with a particular MVNO subscriber. For a different MVNO subscriber, the MME may use a CoS of 3 for video traffic, but the MVNO HSS may instruct the MME to use a CoS of 1 for that subscriber.

In some implementations, the method 300 may include receiving, from a second MME, a second request from the same device. The second request includes the same account identifier and second location data that corresponds to the device. For example, the mobile phone may be in a different location, a different country for example, and may be attempting to use a different MME network for cellular communications. The second request to this second MME may still be routed to the same HSS, e.g., using an account identifier or MVNO identifier associated with the HSS. Using the account identifier included in the request and the second location data, a second CoS may be identified for the device, the second CoS being different from the first CoS. For example, a different MME in a different location may provide a different level of service to the same MVNO subscriber than the first MME in the first location.

Figure 4:
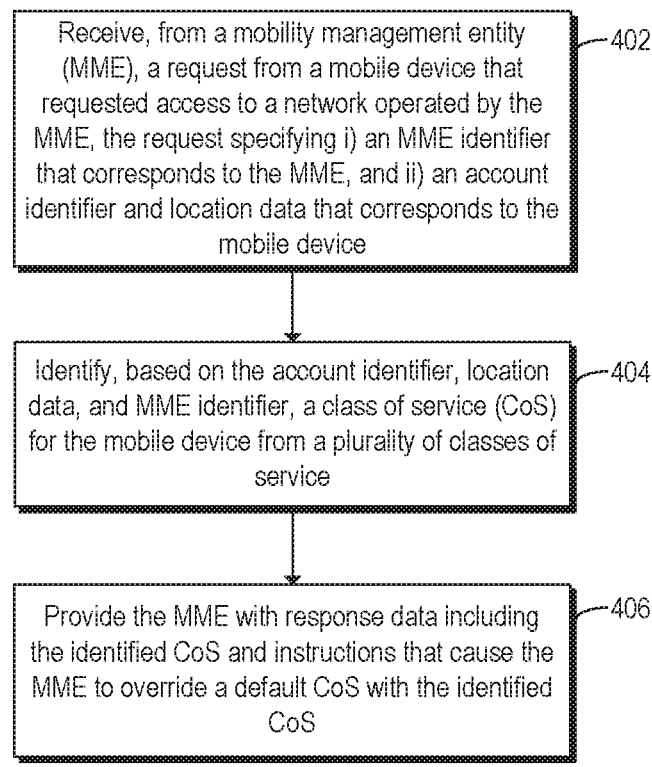
FIG. 4 is a flowchart of an example method for the determination of mobile network class of service.

FIG. 4 is a flowchart of an example method 400 for the determination of mobile network class of service. The method 400 may be performed by a computing device, such as a computing device described with respect to FIG. 1 or the HSS described with respect to FIG. 2. Other computing devices may also be used to execute method 400. Method 400 may be implemented in the form of executable instructions stored on a machine-readable storage medium, such as the storage medium 130, and/or in the form of electronic circuitry, such as an FPGA or ASIC.

From a mobility management entity (MME), a request is received that is from a mobile device that requested access to a network operated by the MME, the request specifying i) an MME identifier that corresponds to the MME, and ii) an account identifier and location data that corresponds to the mobile device (402). As with 302 of the example method 300 above, the request may originate from a cell phone requesting access to the MME's network. The MME identifier may be provided by the MME that received the request, the account identifier may include a cell phone number, and the location data may include the MNC of the country in which the MME operates.

Based on the account identifier, location data, and MME identifier, a class of service (CoS) is identified for the mobile device from a plurality of classes of service (404). For example, account data for a subscriber may be identified using the cell phone number, and the account data may specify a separate CoS to be used for various location and MME combination. In this example situation, the account data may specify the MME specified by the MME identifier and, for that MME, separate classes of service for each of a plurality of locations. The CoS associated with the location specified by the location data may then be identified for the mobile device.

The MME is provided with response data including the identified CoS and instructions that cause the MME to override a default CoS with the identified CoS (406) For example, a response packet may include authorization data indicating that the mobile device is authorized to communicate using the MME and the CoS identifying information, which the MME may use to override its default CoS for the mobile device.

Various portions of the methods 300 and 400 may be performed by one or multiple computing devices. For example, one computing device may be responsible for receiving requests, another computing device may be responsible for identifying a CoS for the requesting device, and another computing device may be used to provide the CoS to the MME.

The foregoing disclosure describes a number of example implementations for determining mobile network class of service. As detailed above, examples provide a mechanism for using the location of the requesting device to identify a CoS that may be different from a default CoS.

We claim:

1. A computing device for determining mobile network class of service, the computing device comprising:
    a hardware processor; and
    a machine-readable storage medium storing instructions that, when executed by the hardware processor, cause the hardware processor to:
    receive, from a mobility management entity (MME), a request from a device that requested access to a network operated by the MME, the request specifying an account identifier and location data that corresponds to the device;
    based on the location data, determine that the device is roaming;
    based on the account identifier and in response to the determination that the device is roaming, identify a class of service (CoS) for the device; and
    provide the MME with response data including the identified CoS, wherein
        the identified CoS is one of a plurality of different classes of service associated with mobile communications devices;
        the MME has a default CoS for the device;
        the identified CoS is different from the default CoS; and
        the response data includes an override that indicates the identified CoS is to override the default CoS, wherein the override of the default CoS with the identified CoS instructs the MME to replace the default CoS used for different accounts using a specified type of traffic with the identified CoS for the identified account using the same specified type of traffic.

2. The computing device of claim 1, wherein:
    the device is a mobile cellular device; and
    the network operated by the MME is a cellular communications network.

3. The computing device of claim 1, wherein the hardware processor determines that the device is roaming based on at least one of:
    a mobile country code (MCC) included in the request; or
    a mobile network code (MNC) included in the request.

4. The computing device of claim 1, wherein the instructions further cause the hardware processor to:
    identify, from a database, account data associated with the account identifier specified by the request, the account data specifying, for each of a plurality of geographic locations, one of a plurality of classes of service, and wherein the identified CoS is selected from the plurality of classes of service based on the geographic location specified by the location data.

5. The computing device of claim 1, wherein the request includes a request for authentication of the device, and wherein the instructions further cause the hardware processor to authenticate the device using the account identifier specified by the request.

6. The computing device of claim 1, wherein the computing device is a home subscriber server (HSS) operating within a network of a mobile virtual network operator (MVNO) and the MME operates within a different network that is in communication with the network of the MVNO.

7. The computing device of claim 1, wherein the instructions further cause the hardware processor to:
receive, from a second MME, a second request from the device, the second request specifying the account identifier and second location data that each correspond to the device;
based on the second location data, determine that the device is roaming;
based on the account identifier and in response to the determination that the device is roaming, identify a second CoS for the device, the second CoS being different from the CoS; and
provide the second MME with second response data including the identified second CoS.

8. A method for determining mobile network class of service, implemented by a hardware processor, the method comprising:
receiving, from a mobility management entity (MME), a request from a device that requested access to a network operated by the MME, the request specifying an account identifier and location data that each correspond to the device;
based on the account identifier and location data, identifying a class of service (CoS) for the device from a plurality of classes of service; and
providing the MME with response data including the identified CoS and instructions that cause the MME to override a default CoS with the identified CoS, wherein the override of the default CoS with the identified CoS instructs the MME to replace the default CoS used for different accounts using a specified type of traffic with the identified CoS for the identified account using the same specified type of traffic.

9. The method of claim 8, wherein the location data includes at least on one of:
a mobile country code (MCC) included in the request; or
a mobile network code (MNC) included in the request.

10. The method of claim 8, further comprising:
identifying, from a database, account data associated with the account identifier specified by the request, the account data specifying, for each of a plurality of geographic locations, one of a plurality of classes of service, and wherein the identified CoS is selected from the plurality of classes of service based on the geographic location specified by the location data.

11. The method of claim 8, wherein the request includes a request for authentication of the device, and wherein the method further comprises authenticating the device using the account identifier specified by the request.

12. The method of claim 8, wherein the hardware processor is included in a home subscriber server (HSS) operating within a network of a mobile virtual network operator (MVNO) and the MME operates within a different network that is in communication with the network of the MVNO.

13. The method of claim 8, further comprising:
receiving, from a second MME, a second request from the device, the second request specifying the account identifier and second location data that each correspond to the device;
based on the account identifier and the second location data, identifying a second CoS for the device, the second CoS being different from the CoS; and
providing the second MME with second response data including the identified second CoS.

14. A non-transitory machine-readable storage medium encoded with instructions executable by a hardware processor of a computing device for determining mobile network class of service, the machine-readable storage medium comprising instructions to cause the hardware processor to:
receive, from a mobility management entity (MME), a request from a device that requested access to a network operated by the MME, the request specifying i) an MME identifier that corresponds to the MME, and ii) an account identifier and location data that corresponds to the device;
based on the account identifier, location data, and MME identifier, identify a class of service (CoS) for the device from a plurality of classes of service; and
provide the MME with response data including the identified CoS and instructions that cause the MME to override a default CoS with the identified CoS, wherein the override of the default CoS with the identified CoS instructs the MME to replace the default CoS used for different accounts using a specified type of traffic with the identified CoS for the identified account using the same specified type of traffic.

15. The storage medium of claim 14, further comprising instructions that, when executed, cause the hardware processor to:
identify, in an account information database, account data associated with the account identifier specified by the request, the account data specifying, for each of a plurality of geographic locations, one of a plurality of classes of service, and wherein the identified CoS is selected from the plurality of classes of service based on the geographic location specified by the location data.

16. The storage medium of claim 14, further comprising instructions that, when executed, cause the hardware processor to:
identify, in an account information database, account data associated with the account identifier specified by the request, the account data specifying, for each of a plurality of MMEs, one of a plurality of classes of service, and wherein the identified CoS is selected from the plurality of classes of service based on the MME specified by the MME identifier.

17. The storage medium of claim 14, wherein the storage medium is included in a home subscriber server (HSS) operating within a network of a mobile virtual network operator (MVNO) and the MME operates within a different network that is in communication with the network of the MVNO.

18. The storage medium of claim 14, further comprising instructions that, when executed, cause the hardware processor to:
receive, from a second MME, a second request from the device, the second request specifying i) a second MME identifier that corresponds to the second MME, and ii) the account identifier and location data that each correspond to the device;
based on the account identifier, location data, and second MME identifier, identify a second CoS for the device, the second CoS being different from the CoS; and
providing the second MME with second response data including the identified second CoS.

19. The computing device of claim 1, wherein the type of traffic with the identified CoS comprises at least one of: voice traffic, video traffic, and best effort traffic.

20. The computing device of claim 19, wherein the override comprises replacing the default CoS used for voice traffic with the identified CoS only for the identified account using voice traffic.

* * * * *